(No Model.)
H. WALTER.
CAR BRAKE.
No. 244,343. Patented July 12, 1881.
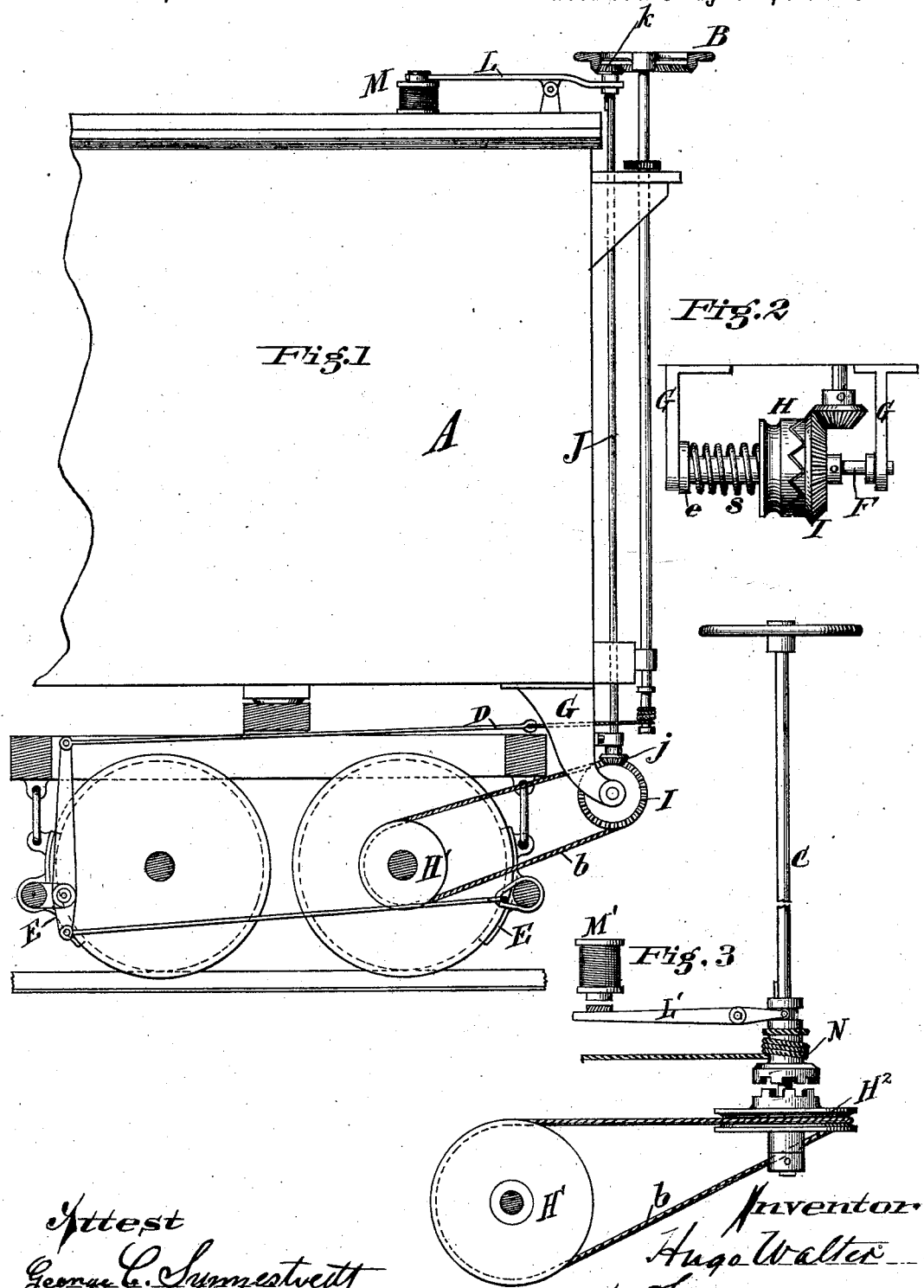

UNITED STATES PATENT OFFICE.

HUGO WALTER, OF CINCINNATI, OHIO, ASSIGNOR TO HIMSELF AND L. W. GOSS, H. D. PECK, A. L. DUWELIUS, AND FRANK R. MERRILL, ALL OF SAME PLACE.

CAR-BRAKE.

SPECIFICATION forming part of Letters Patent No. 244,343, dated July 12, 1881.

Application filed May 31, 1881. (No model.)

*To all whom it may concern:*

Be it known that I, HUGO WALTER, a citizen of the United States, residing at Cincinnati, Hamilton county, Ohio, have invented new and useful Improvements in Brake Mechanism, of which the following is a specification.

My invention relates to the employment of electro-magnetic force in braking railway-trains, and in the present case contemplates utilizing the momentum of a moving car as the force to operate the brakes, and the employment of the magnetic force as a means of connecting and setting in motion the brake mechanism.

The accompanying drawings exhibit a form of mechanism embodying my invention and illustrating the principle of its operation.

In these drawings, Figure 1 shows the end of a railway freight-car in side elevation, with my brake-operating mechanism attached. Fig. 2 is a side elevation of the counter-shaft, showing the spring-actuated clutch; and Fig. 3 shows a slightly modified form of the mechanism, in which the counter-shaft is dispensed with.

Similar letters of reference indicate similar parts in both specification and drawings.

Referring to the drawings in aid of the description, the car A is provided with the ordinary hand-brake mechanism, consisting of a hand-wheel, B, with its shaft C, upon the lower end of which is wound the brake-chain D, which actuates the brakes E E in the usual manner. In addition to these means of braking and as an alternative substitute, I provide a counter-shaft, F, parallel with the axle, journaled in brackets G depending from the body of the car, which is driven by means of a belt, wire rope, or chain, $b$, passing over pulleys or sprocket-wheels H H', secured, respectively, upon the counter-shaft F and the axle of the car. A bevel-pinion, I, is also rigidly secured upon the counter-shaft F. I also arrange a vertical shaft, J, in bearings adjacent to the end of the car, so that a bevel-pinion, $j$, at its lower end, will mesh with and communicate motion to the brake-wheel B through an annular cog-gear formed upon it, or to an internal bevel-gear wheel secured at any convenient point upon the brake-wheel shaft C. By this means the rotating power of the axle is transmitted to and caused to actuate the brake mechanism. In order, however, to be able to apply or relieve the power at will, the upper pinion, $k$, is loose upon the shaft J, and free to move vertically, but its independent rotation is prevented by a feather upon the shaft J, fitting a corresponding slot or groove in the pinion $k$. The pinion $k$ is connected, by means of a loose collar operating in a groove turned in the periphery of its hub, with a lever, L, which is the armature of an electro-magnet, M, placed at any convenient point upon or in the car, and controlled by the usual battery-connections from the engine or caboose in such manner that as the armature is attached to the magnet the loose pinion $k$ is lifted into mesh with the brake-wheel B, and when the armature drops off its magnet the pinion drops out of mesh. It will thus be seen that the shaft J, which is in constant rotation by its connections with the revolving axle of the car, is caused to communicate its power at will to the brake mechanism.

In order to prevent the application of too great a force to the brakes the sheave or sprocket-wheel H upon the counter-shaft is arranged to run loosely upon it, and the adjacent sides of the fixed pinion I and loose wheel H are provided with lines of radial curved or V-shaped cogs, meshing with each other when the wheels are normally in contact. The loose wheel H is held normally in mesh with the fixed pinion I by a coiled spring, $s$, interposed between it and a fixed collar, $c$, upon the counter-shaft F. The strength of the spring is so proportioned in relation to the angle of the cog-faces as that when the required power is attained the cogs will slip apart and allow the wheel H to rotate independently upon the axle.

In the modification shown in Fig. 3, I dispense with the counter-shaft F, and arrange a sheave, H², to run loosely upon the lower end of the brake-shaft, provided on its upper side with a line of annular cog-teeth, and I place on the brake-shaft, above it, a loose annular cog-pinion, N, to mesh with it.

The pinion N is arranged with a feather upon the brake-shaft to act as a clutch, in connection with the loose sheave or pulley H², when dropped into mesh with it. Upon the hub of the pinion N is wound the brake-chain, or the latter may be wound upon the brake-shaft independently. The pinion or clutch N is arranged to be moved into or out of mesh with the pulley H² at will by the action of the electro-magnet M' and armature-lever L', as before described. The particular arrangement of the parts may be varied to suit the construction of the brake mechanism proper, and the slipping of the belt or any other suitable means may be introduced to prevent over-strains.

Having described my invention, I claim and desire to secure by Letters Patent—

1. The combination, with the described hand-brake mechanism of a railway-car, of an electro-magnet and a lever, constituting the armature of the magnet, and connecting devices between the brake mechanism and the said lever, which are automatically thrown into and out of gear by the lever through the medium of the magnet, substantially as described.

2. The combination of a pulley continuously rotated from the axle of a railway-car with a clutch, an electro-magnet, and a lever connected with the clutch and constituting the armature of the magnet, said lever controlling the clutch through the medium of the magnet for automatically engaging and disengaging the clutch and the continuously-rotating pulley, substantially as and for the purpose described.

3. The combination of the brake-bar C and brake-actuating connections, a gear-wheel, H, driven from the car-axle, a supplemental shaft, J, provided with gears adapted to communicate the rotation of the gear-wheel H to the brake-bar, and a lever arranged to throw a clutch or pinion into or out of gear between the supplemental shaft and the brake-shaft, substantially as and for the purpose specified.

4. In combination with the pulleys H and H' and transmitting cord or belt b, the counter-shaft F, bevel-pinion I, shaft J, fast and loose pinions j and k, brake-wheel B, lever L, and electro-magnet or other motive power, substantially as specified.

5. In a brake mechanism for railway-cars, a horizontal counter-shaft, F, journaled in bearings beneath the car, and a loose pulley H, arranged thereon and continuously rotated by the axle of the car, and provided with V-shaped teeth, in combination with a pinion, I, fixed on the counter-shaft and provided with V-shaped teeth, and a spring arranged to hold the loose pulley normally in mesh with the fixed pinion, substantially as described.

In testimony whereof I have hereunto set my hand and seal in the presence of two subscribing witnesses.

HUGO WALTER. [L. S.]

Witnesses:
C. P. DOOLITTLE,
ANDREW NAILOR.